Feb. 27, 1945.  L. J. DU MAIS  2,370,611
CAMERA SUPPORT
Filed Oct. 6, 1942
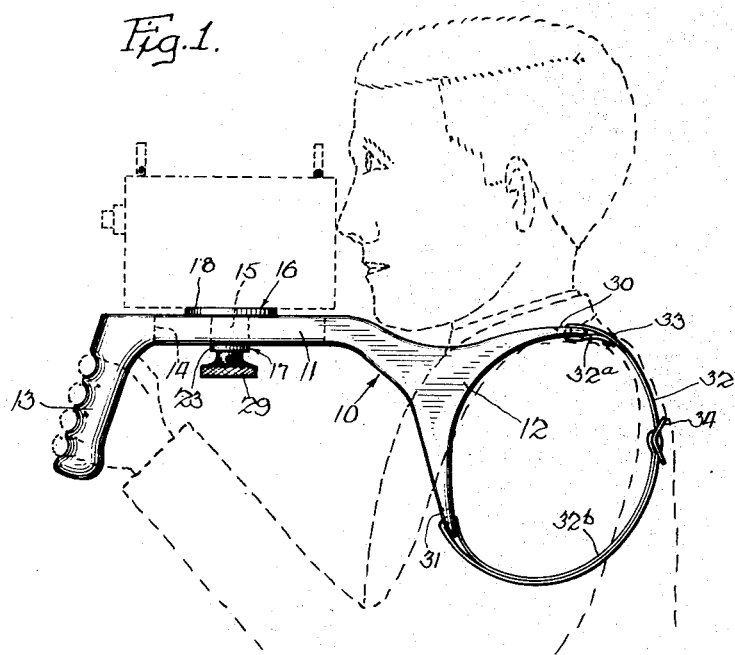
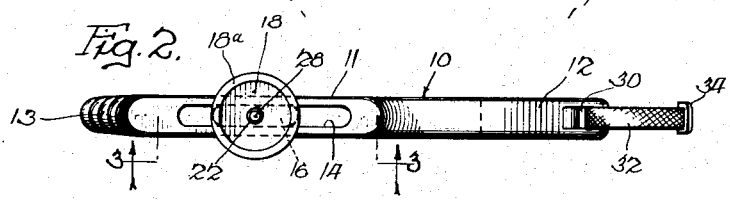
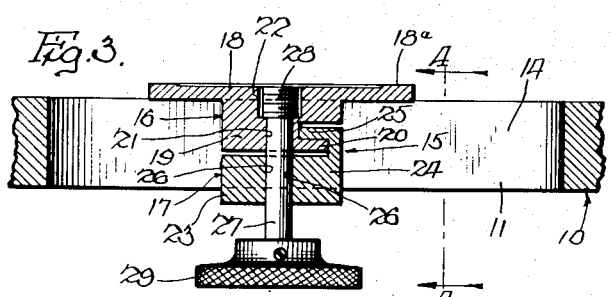
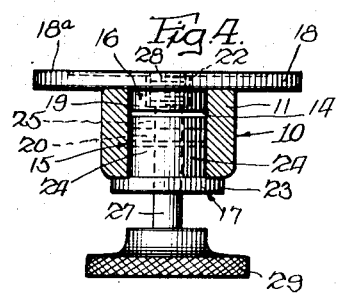
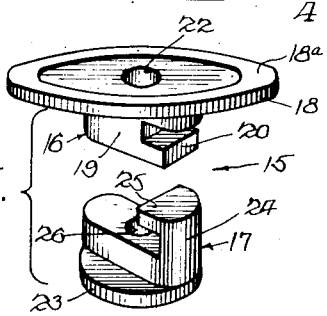
Inventor:
L. J. Du Mais Patented Feb. 27, 1945

2,370,611

UNITED STATES PATENT OFFICE 2,370,611

CAMERA SUPPORT

Leo J. Du Mais, Chicago, Ill., assignor to Da-Lite Screen Company, Inc., Chicago, Ill., a corporation of Illinois Application October 6, 1942, Serial No. 461,032

3 Claims. (Cl. 95—86)

The present invention relates to a camera support and is more particularly directed to a shoulder type of support on which the camera is secured and which support is bodily carried and maneuvered with the camera thereon.

It is an object of the present invention to provide a camera support which is strong and durable, simple in construction and inexpensive to manufacture, and which support may be easily and readily handled for the instantaneous taking of pictures at any desired or required angle.

A further object is the provision of a camera support having a shoulder rest at one end and a hand grip at its other end and between which rest and grip a camera retainable member is slideably positioned to selectively retain the camera at any desired angular position on the support.

A further object is the provision of manually manipulative means slideably arranged on the support and rotatable for attachment to the camera; the attaching means being such as to effect a frictional gripping action for retaining said manipulative means in fixed adjusted positions on the support. And a still further object is the provision of adjustable strap means on the shoulder rest whereby the support and camera may be suspended from the shoulder of the wearer and may be instantly swung into picture taking position.

Referring to the drawing:

Figure 1 is a view inside elevation of the camera support embodying my invention, illustrating its use with a camera secured thereon in dotted lines.

Figure 2 is a top plan view of the camera support.

Figure 3 is an enlarged detail partial longitudinal sectional view taken substantially on line 3—3 of Figure 2.

Figure 4 is a cross-sectional view taken on line 4—4 of Figure 3.

Figure 5 is an exploded detail perspective view of the slide and guide means. The reference numeral 10 designates the camera support as a whole, and which support comprises a relatively long body portion 11 which has a shoulder rest 12 provided at one end thereof and a hand grip 13 depending from its other end. The body portion 11 of the support 10 is provided with a longitudinally extending slot opening 14 which extends vertically through body portion 11 and provides a guideway for an interlocking slide and guide means designated as a whole as 15. This slide and guide means 15 consists of two members, a top member 16 and an interlocking lower member 17. The top member 16 has a substantially flat disc portion 18 which is adapted to rest on the support and an integral depending portion 19 of the disc extends in the slot 14 of the support for a sliding movement therein. The depending portion 19 is provided on one edge thereof with an L-shaped formation 20 and a centrally disposed vertical bore 21 which terminates into a larger bore 22 at the upper end of member 16. The lower member 17 is provided with a relatively small disc portion 23 which has an integral upwardly extending portion 24 of the same shape and size as the depending portion 19 of member 16. This portion 24 is also provided with an L-shaped formation 25 and arranged to interlock with the L-shaped formation 20 of the top member 16. The lower member 17 is also provided with a vertical bore 26 which is adapted to be brought into alignment with the vertical bore 21 when the top and lower members 16 and 17, respectively, are placed with their portions 19 and 24, respectively, projecting into the slot opening 14 of the support and with their L-shaped formations 20 and 25, respectively, interlocked.

When the members 16 and 17 are thus interlocked, a relatively long shanked screw 27 is positioned through the bores 21 and 26 with the enlarged threaded end 28 of the screw received in the enlarged bore 22. A knurled knob 29 is secured to the lower end of the screw 27 and which screw is of a sufficient length to permit of a vertical sliding movement thereof in the interlocked members 16 and 17 to project the threaded end 28 of the screw above the disc 18. With this arrangement of screw, the threaded end is always flush within the large bore 22 which permits of readily placing the camera on disc 18 to be secured in position by the screw 27. The tightening of screw 27 into the camera will force the top and lower members 16 and 17 together to frictionally clamp the support and retain said members and camera in fixed adjusted position. When the screw 27 is threaded into the camera, the knob 29 thereof will be brought into engagement with the disc portion 23 of the lower member and the camera will be drawn tightly against the disc 18 thereby effecting a clamping between the two discs.

The portions 19 and 24 of the members 16 and 17, respectively, are arranged to slideably fit within the slot opening 14, of the support and when clamped as above described, will retain the camera in the position to which it has been adjusted. Also this construction permits of the pivotal adjustments of the camera to align the same to suit the user.

The shoulder rest 12 is provided with openings 30 and 31, respectively, to receive a strap 32 therethrough which is of sufficient length to extend about the shoulder and serves as means to bodily suspend the support and camera on the users' shoulders.

While in this suspended position, the user will grip the hand grip, which is preferably of the machine gun type and provides means to rigidly hold the support against the shoulder with the view finder of the camera properly aligned with the user's eye.

The shoulder strap 32 has one end 32a positioned through opening 30 of the shoulder rest and is secured at 33, and the free end 32b of the strap is slideably positioned through opening 31 of the rest and has an adjusting means 34 fixed thereto and slidably carried on the strap. This construction permits of the adjustment of the strap to suit the user.

While the strap is for the purpose of bodily carrying the support and camera, the same may be omitted when desired.

It will be noted, that the disc 18 on which the camera rests, is slightly relieved to form an annular ring 18a which serves to better hold the camera when secured to the support.

The support or frame comprising the main body portion with a shoulder rest on one end and a hand grip at its other end has been illustrated as of solid formation, but the same may be relieved or embellished, or may be constructed of formed wire without departing from the scope of invention.

I claim:

1. In a camera support, a main member, a shoulder rest at one end of said main member, a hand grip at the other end of the said member, camera attaching means between said rest and grip, said camera attaching means comprising upper and lower interlocking members adjustably positionable on said support, and means extending through the interlocking members whereby to secure a camera and to bodily move the said interlocking members into frictional engagement with the said main member for securely retaining the same on the support.

2. In a camera support, a main member having a shoulder rest at one end thereof, and a hand grip at its other end and a vertically disposed slot opening extending between said rest, and grip, camera attaching means slidable in said slot opening, said means comprising upper and lower interlocking members adjustably positionable in said slot opening of the supports and means coacting with said interlocking members for securing a camera thereto and for clamping said interlocking members in adjusted position on the support.

3. In a camera support of the character described, comprising, a body portion having an elongated slot opening therein and a shoulder rest at one end thereof and a hand grip at its other end, and means retainable in said slot opening and moveable therein, said means comprising interlocking members moveable toward each other, and a camera attaching screw extending through said members and serving to move said members to frictionally engage said body portion when said screw is threaded into a camera.

LEO J. DU MAIS.